Figure 1:
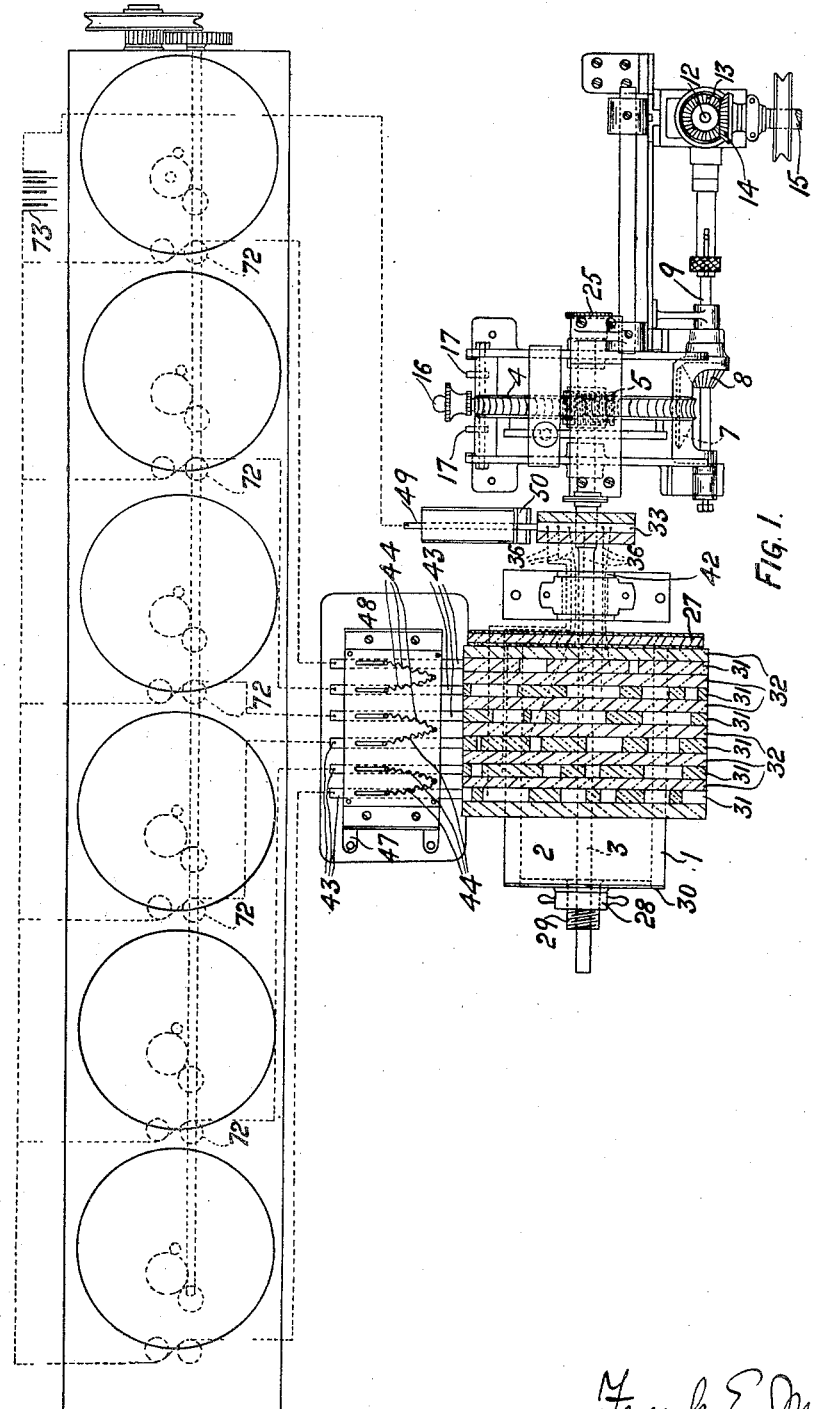

Aug. 7, 1923.  1,464,329
F. E. MOSLEY
APPARATUS FOR CONTROLLING THE OPERATION OF A TALKING MACHINE OR MACHINES IN TIMED RELATION TO A CINEMATOGRAPHIC MACHINE
Filed Nov. 29, 1920    7 Sheets-Sheet 1

Aug. 7, 1923.  
1,464,329  
F. E. MOSLEY  
APPARATUS FOR CONTROLLING THE OPERATION OF A TALKING MACHINE OR MACHINES IN TIMED RELATION TO A CINEMATOGRAPHIC MACHINE  
Filed Nov. 29, 1920     7 Sheets-Sheet 2

Aug. 7, 1923. 1,464,329
F. E. MOSLEY
APPARATUS FOR CONTROLLING THE OPERATION OF A TALKING MACHINE OR
MACHINES IN TIMED RELATION TO A CINEMATOGRAPHIC MACHINE
Filed Nov. 29, 1920 7 Sheets-Sheet 3

Aug. 7, 1923.

F. E. MOSLEY

APPARATUS FOR CONTROLLING THE OPERATION OF A TALKING MACHINE OR MACHINES IN TIMED RELATION TO A CINEMATOGRAPHIC MACHINE

Filed Nov. 29, 1920    7 Sheets-Sheet 4

1,464,329

Frank E. Mosley
by his attorney
Pennie, Davis, Marvin & Edmonds

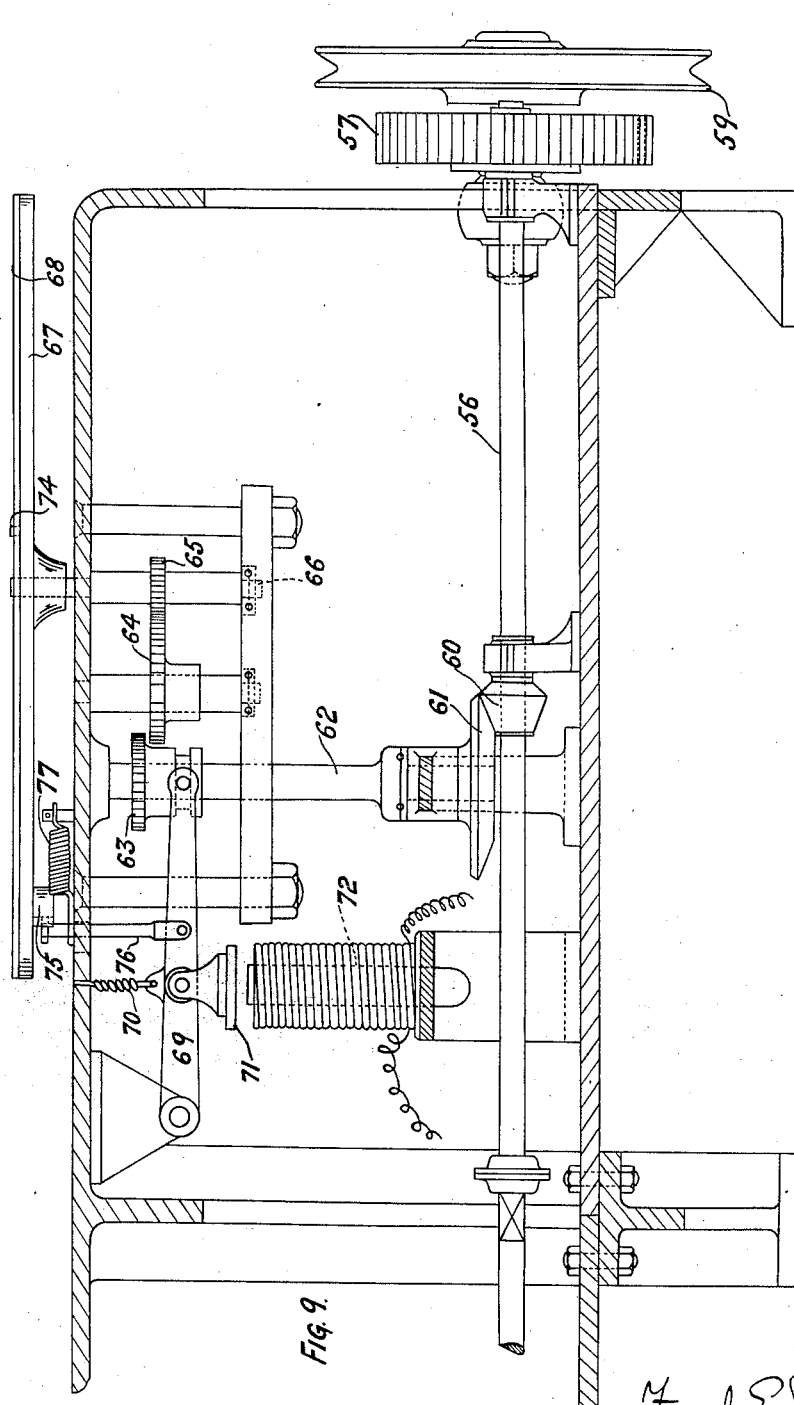

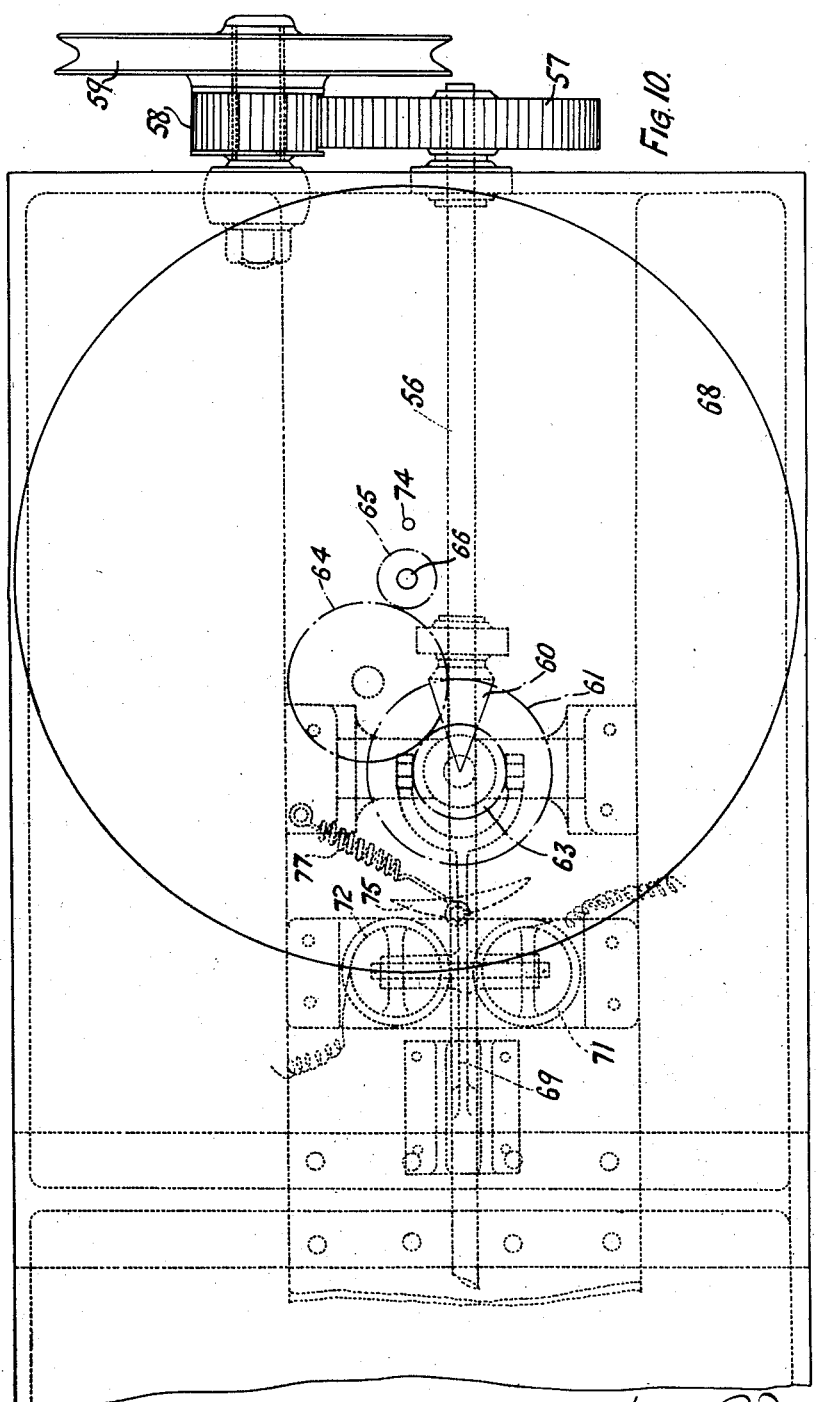

Patented Aug. 7, 1923.

1,464,329

UNITED STATES PATENT OFFICE.

FRANK ERNEST MOSLEY, OF GLASGOW, SCOTLAND.

APPARATUS FOR CONTROLLING THE OPERATION OF A TALKING MACHINE OR MACHINES IN TIMED RELATION TO A CINEMATOGRAPHIC MACHINE.

Application filed November 29, 1920. Serial No. 427,134.

*To all whom it may concern:*

Be it known that I, FRANK ERNEST MOSLEY, a subject of the King of the United Kingdom of Great Britain and Ireland, and residing at Shettleston, Glasgow, Scotland, have invented a certain new and useful Improvement in Apparatus for Controlling the Operation of a Talking Machine or Machines in Timed Relation to a Cinematographic Machine, of which the following is a specification.

This invention relates to improved apparatus for rendering practicable the production of song, speech or other sound in connection with cinematograph displays and the like.

For the production of talking pictures, singing pictures and the like it has been proposed heretofore to employ cinematographic machines and phonographs driven in synchronism, the phonograph being speeded up and retarded with acceleration and retardation of the speed of the cinematographic machine.

The present invention is differentiated from such prior proposals in respect that the phonograph or phonographs is or are driven intermittently, independently of the cinematographic machine, at the correct speed for proper reproduction of the sounds, the phonograph or phonographs being automatically coupled to and uncoupled from the driving means therefor at predetermined times selected to accord with gestures of particular characters, incidents or other features of the photoplay or the like being represented.

While the invention is applicable generally as a means of controlling any audible accompaniment of a cinematographic display, for example, the oral delivery of the description of a picture, for the sake of simplicity I describe the invention as applied to the control of the delivery of vocal sounds assumed to be uttered by or to characters of a photoplay.

Generally speaking, the duration of a cycle of operation of a talking machine or phonograph using record discs or cylinders is considerably less than that required for the exhibition of a moving picture of the usual reel length. Inasmuch, however, as conversation, for example, is seldom continuous, I find it unnecessary with my invention to employ talking machines operating "in series", as, in lieu of allowing the record disc or cylinder to rotate idly during periods of silence, I bring it to rest and restart it only when the play requires recommencement of vocal sound, thus eliminating avoidable surface sound.

Again, and this is of great practical importance, my invention renders it possible to employ a number of talking machines operating "in parallel", one machine say for each character or group of characters, the machines being brought into operation selectively.

With these objects I provide what I prefer to term a selector-commutator which when used in the theatre is driven from the cinematographic machine at reduced speed and which effects at the required times the starting and stopping of the talking machine or machines.

It will thus be seen that for a theatre in which is installed a drive for the selector-commutator, a talking machine or machines with driving means therefor and controlling means operable by the selector-commutator, the only additional materials required for the production of a given talking or singing picture, for example, are a selector-commutator appropriate to that picture and the requisite talking machine records. These additional materials can of course be supplied for hire.

The talking machine records can be prepared entirely independently of the actors in the photoplay or the like. For example, the speeches attributed to any given character in the libretto of the play can be repeated by elocutionists and records thereby obtained. When the play is being reproduced, the controlling means influenced by the selector-commutator will start a talking machine each time one of these speeches is to be delivered, will then stop the talking machine, and will restart such talking machine or another talking machine at the proper times.

I have above referred to the controlling means as being operable by a selector-commutator, inferring thereby that an electrically operated control is contemplated. It should be understood, however, that the control may be effected otherwise.

In the specification of the co-pending application No. 427,133 there is described a machine for producing graphs representative of the duration of periods of sounds or successions of sounds and of intervals of silence of characters in a photoplay or the like. It will be obvious to those skilled in the art that from such graphs it is possible to obtain accurate commutator devices in which say each period of sound is represented by a conducting segment and each period of silence is represented by a segment of insulation, or vice versa.

In the following description it is assumed that the completion of a circuit through a conducting segment causes the talking machine to be coupled to its driving means.

Figure 2:
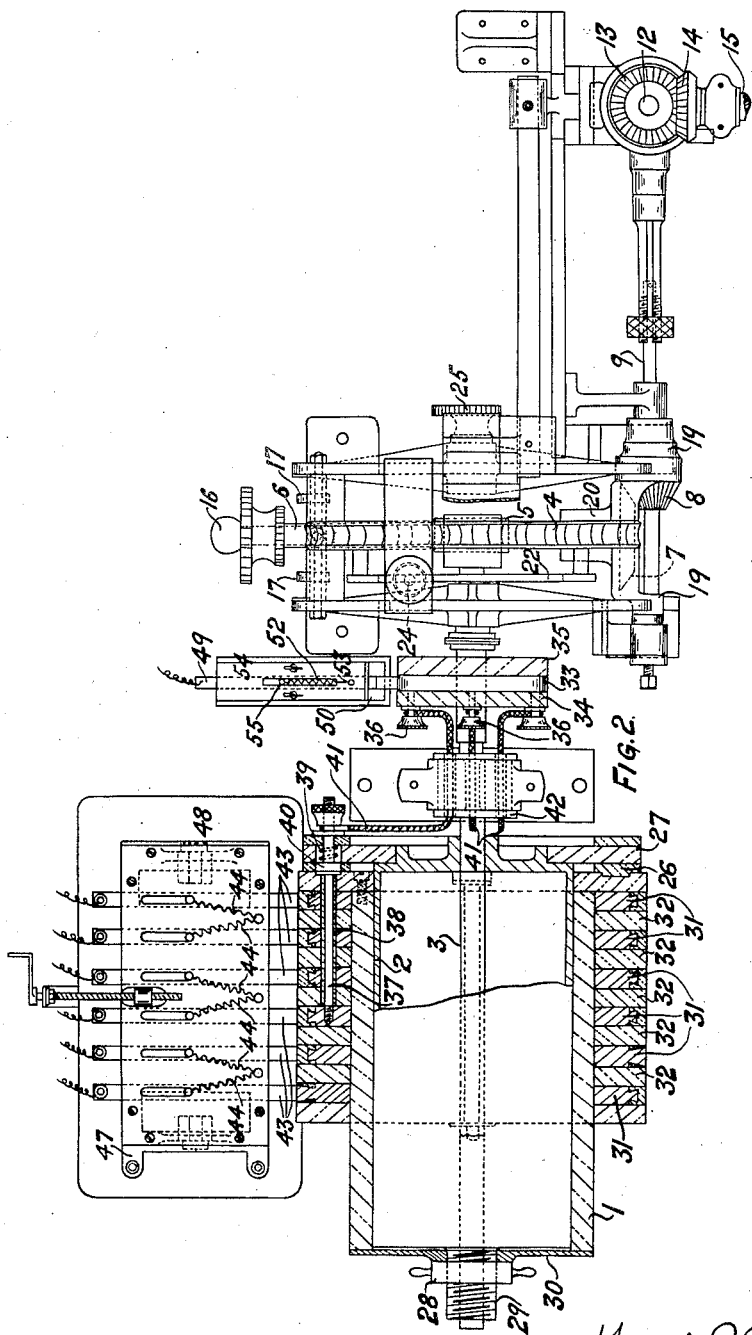
Figure 3:
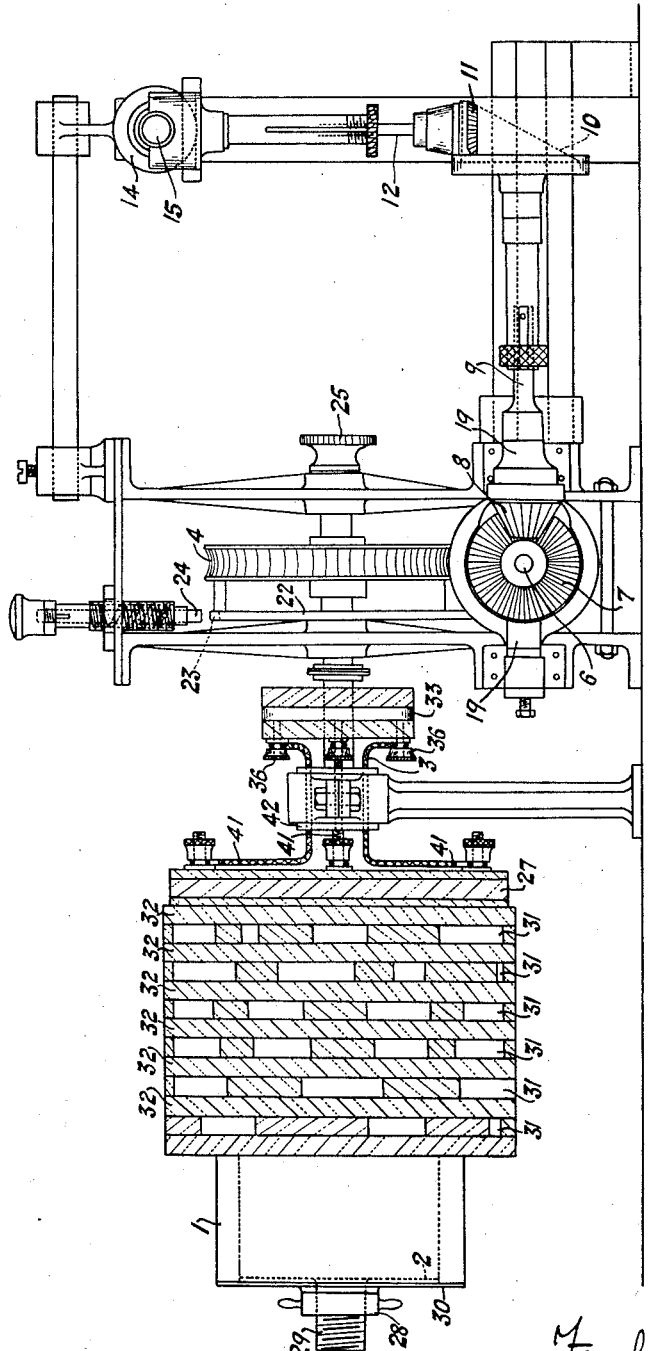
Figure 4:
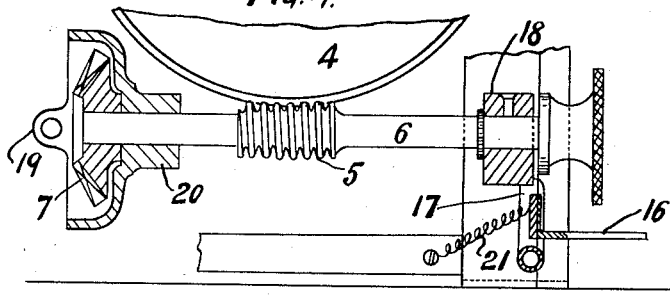
Figure 7:
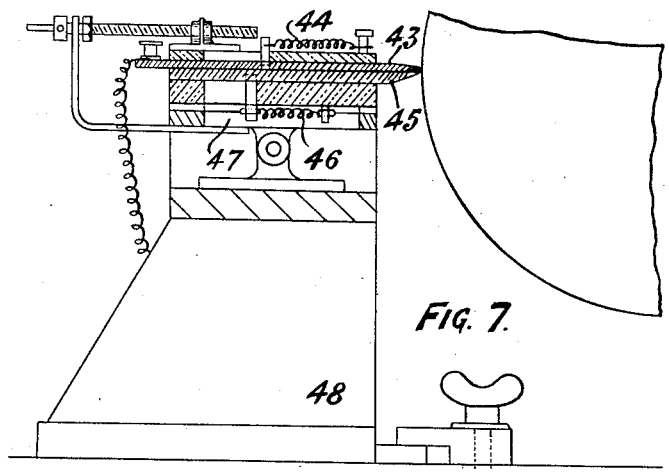
Figure 5:
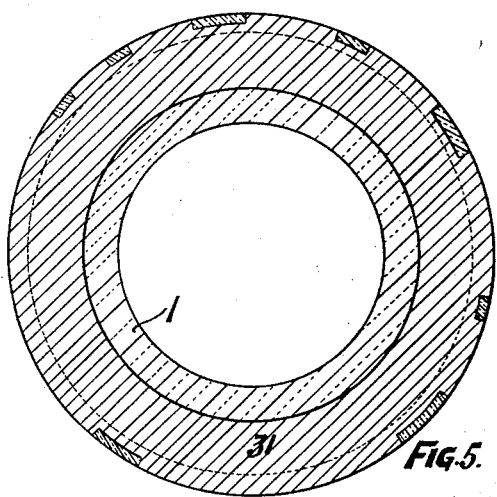
Figure 6:
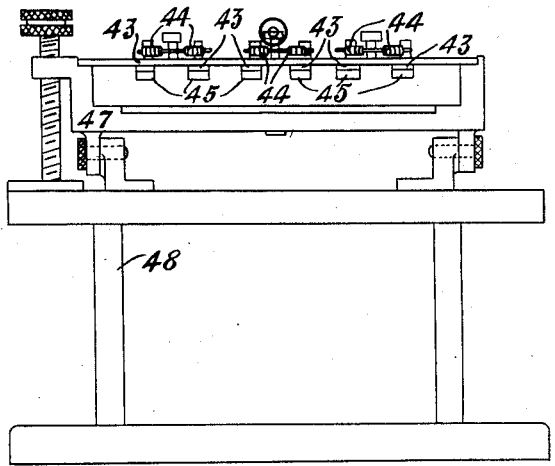
Figure 8:
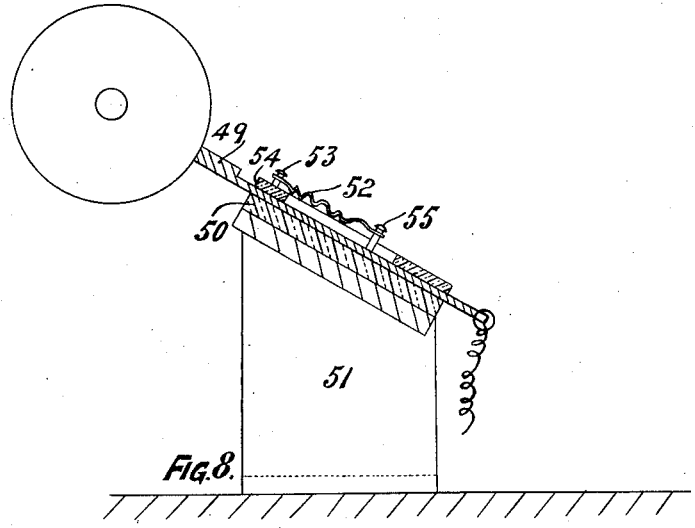

The invention is illustrated in the accompanying drawings in which Fig. 1 is a diagrammatic plan showing an installation embodying the invention and including in the particular instance illustrated six talking machines. Fig. 2 is a plan to a larger scale, showing the selector commutator and driving means therefor. Fig. 3 is an elevation corresponding to Fig. 2. Fig. 4 is a detail view of part of the driving mechanism for the selector-commutator. Fig. 5 is a section of the selector-commutator. Fig. 6 is an elevation of the frame carrying the brushes that cooperate with the selector-commutator. Fig. 7 is an end view partly in section showing one of the brushes. Fig. 8 shows a return conducting ring and a brush in contact therewith. Fig. 9 is a vertical section and Fig. 10 a plan showing the means for controlling the operation of the talking machine.

I shall first explain the arrangement for driving the selector-commutator, which in the present instance is employed in connexion with the control of six talking machines it being understood, of course, that the invention is applicable to an installation comprising any desired number of talking machines.

Referring to the drawings, 1 denotes a drum of insulating material carrying the commutator rings, said drum being fitted to a mandrel 2 fixed on a shaft 3 which in practice is connected through reduction gearing with the film-feeding spindle of a cinematographic machine. In the construction illustrated an extension of the shaft 3 carries a worm wheel 4 meshing with a worm 5 on a short shaft 6 carrying also a bevel gear 7 meshing with bevel gear 8 on one end of a shaft 9 at the opposite end of which is a bevel gear 10 engaged by a bevel gear 11 on a spindle 12 carrying a bevel gear 13 meshing with a bevel gear 14 on a shaft 15 operatively connected by any suitable means with the film-feeding spindle of a cinematograph projector (not shown).

Provision is made for disconnecting the shaft 3 from the driving gear and for arresting rotation of the drum 1.

As shown, the shaft 6 on which the worm 5 is cut or fixed is adapted to be lowered, the lowering of the shaft 6 bringing the worm 5 out of mesh with the worm wheel 4. To lower the shaft 6, the operator depresses the lever 16 attached to detents 17 on which rests the bearing 18 supporting one end of the shaft 6, thereby allowing the shaft 6 to swing around the axis of the shaft 9 carried by bearing members 19 integral with the main bearing 20 of the shaft 6. To bring the worm again into mesh, the free end of the shaft 6 is lifted, whereupon the spring 21 restores the detents 17 to supporting position. Connected to the worm wheel 4 is a ring 22 formed with a peripheral notch 23 engageable by a spring-pressed pin 24 when the drum is in correct position for starting. As the drum may have performed only a partial rotation by the time a film has completely passed through the cinematographic machine, it is desirable to be able to bring the drum readily to the same starting position independently of the cinematographic machine. With the present arrangement, when the worm 5 is out of mesh with the worm wheel 4, and the spring-pressed pin 24 is disengaged from the notch 23, the drum 1 and shaft 3 may be further rotated by manual operation of a knob 25 on the end of the shaft 3 until the notch 23 is in position to be engaged by the pin 24. There is but one possible angular position of the drum 1 relatively to the shaft 3, the drum being secured in driving position by means of the boss 26 fixed on the driving flange 27 and by the nut 28 threaded on a boss 29 of the drum-carrying mandrel 2 and pressing on the washer 30.

The selector-commutator includes a number of metallic rings 31 held in fixed angular relation to the drum 1 and separated by rings 32 of insulating material; each of the rings 31 presenting on its periphery conducting segments spaced by segments of insulation, the latter being fitted into peripheral notches of the rings 31 and united by annuli of insulation, as shown in Fig. 5.

On the shaft 3 is a return conducting ring 33 interposed between two rings 34, 35 of insulating material.

The rings 31 are electrically connected to terminals 36 on the ring 33. Threaded into each ring 31 is a conducting pin 37 sheathed in a tube 38 of insulating material led parallel to the axis of the shaft 3. The driving flange is formed with pockets, one opposite each pin 37, and in each pocket is received a spring 39 urging a terminal 40 into contact with the head of the pin 37. Each terminal 40 is connected by a cable 41 laced through a rotatable bearing member 42 to the corresponding terminal 36 on the ring 33.

Normally the terminals 40 protrude slightly from the inner face of the driving flange, so that when the selector-commutator is slipped on to the mandrel 2 in correct position and the nut tightened up, the electrical connections will be completed without necessity for further manipulations. The services of a skilled electrician are thus quite unnecessary.

Co-operating with the selector-commutator are a number of brushes or collectors 43 presenting knife edges engageable with the commutator rings and each urged by a spring 44 towards the corresponding ring 31.

Each brush or collector 43 slides on a strip 45 of insulating material urged by a spring 46 towards the ring 31 and contributing to the prevention of the formation of arcs.

As shown, the brushes 43 and strips 45 are mounted on a rocking frame 47 carried by a standard 48 adjustable as a whole towards and from the selector-commutator.

The brush or collector 49 contacting with the ring 33 is slidable in a groove in a block 50 of insulating material resting on a stand 51, being continuously urged into contact with the ring 33 by a spring 52 of which one end is anchored to a pin 53 fixed to a plate 54 of insulating material and of which the other end is connected to a pin 55 fixed to the brush or collector 49.

The talking machines receive their actuation from a shaft 56 driven by gears 57, 58 from a continuously running pulley 59, operative relation between the turntables and the shaft 56 being established and disestablished by the opening and closing of circuits containing the rings 31.

Fixed on the shaft 56 at intervals are bevel gears 60 each meshing with a bevel gear 61 on an upright shaft 62 carrying a spur pinion 63 engageable with an idler wheel 64 meshing with a pinion 65 on the upright shaft 66 carrying the turntable 67 on which is carried the record disc 68.

The pinion 63 is slidable on the shaft 62 into and out of engagement with the idler 64 according as it is desired or not to transmit movement from the shaft 56 to the shaft 66.

The sliding movement of the pinion 63 is effected by rocking a lever 69 forked at one end to embrace the boss of the pinion 63 and pivoted at the opposite end.

Between its ends the lever 69 is supported by a spring 70. The lever 69 carries also between its ends an armature 71 adapted to be attracted by an electromagnet 72 when the latter is excited.

As shown, the excitation circuits include a battery 73, a lead with branches therefrom to the electro-magnets 72, and thence to the brushes 43, and thence by way of the rings 31 to the ring 33, and a return connection from the ring 33.

It will be understood that each of the electro-magnets 72 is excited when the circuit is closed through the corresponding ring 31, and that when the brush 36 passes on to a segment of insulation the electromagnet will be de-energized and the spring 70 will raise the lever 69 to bring the spur pinion 63 out of mesh with the idler.

As the record is intended for intermittent reproduction, the disc 68 must be stopped and started in one predetermined position only.

Provision is therefore made for positively locating the disc 68 in relation to the turntable 67 so that it can only occupy one operative position in relation to the turntable and provision is made whereby the turntable 67 is positively arrested in one position only of its circular path.

For locating the disc 68 relatively to the turntable 67, the disc is apertured for engagement by a pin 74 or the like on the turntable 67 and, for arresting the turntable there is fixed on the underside of the turntable a catch 75 positively engageable by a detent 76 urged towards the catch by a spring 77 and adapted to be moved into its positions of engagement and disengagement concomitantly with the up and down movements of the pinion 63.

It will be understood that when the detent 76 is retracted the rotation of the disc 68 may be immediately initiated so that the reproduction of the record will commence at the exact instant desired. When the speech or the like is completed, no matter how many rotations is has already effected, the disc 68 completes any rotation already partially effected, while the sound box continues silent, the turntable 67 being positively arrested in its predetermined position by the detent 76 immediately on completion of such rotation.

It will be understood of course that the talking machine or machines may be located in any position convenient for the purpose of the entertainment while the selector-commutator and its driving means may be located in the lantern house or in fact in any convenient position.

I claim :—

1. Apparatus for ensuring the operation of phonographs in timed relation to a cinematographic machine, comprising the combination of a continuously operated driver for the phonographs, said driver being independent of the cinematographic machine, means for coupling and uncoupling the driver and the phonographs, a selector switch independent of the film in continuous driving relation with the cinematographic machine, and circuits controlled by said switch for determining the operation of said coupling and uncoupling means at predetermined times.

2. The combination of a cinematograph, a phonograph, a commutator geared to the cinematograph and comprising a selector ring having alternating conducting and non-conducting peripheral segments, a return ring and a connection between the conducting segments of the selector ring and the return ring, a brush contacting with each ring, electro-magnetic means for stopping and starting the phonograph, said electro-magnetic means being included within an electric circuit with the brushes and the two rings.

In testimony whereof I have signed my name to this specification in the presence of two subscribing witnesses.

FRANK ERNEST MOSLEY.

Witnesses:
ISABEL ROLLO,
FLORENCE HOUSTON.